(12) United States Patent
Yoo

(10) Patent No.: US 6,473,216 B1
(45) Date of Patent: Oct. 29, 2002

(54) OPTICAL SCANNER

(75) Inventor: Bong Joon Yoo, Suwon-Shi (KR)

(73) Assignee: Samsung Electro-Mechanics Co., Ltd., Shi Kyungki (KR)

( * ) Notice: Subject to any disclaimer, the term of this patent is extended or adjusted under 35 U.S.C. 154(b) by 59 days.

(21) Appl. No.: 09/605,303

(22) Filed: Jun. 28, 2000

(30) Foreign Application Priority Data

Jul. 27, 1999 (KR) ............................................ 99-30523

(51) Int. Cl.$^7$ ................................................ G02B 26/08
(52) U.S. Cl. ........................ 359/207; 359/205; 359/216; 359/217
(58) Field of Search ................................ 359/205–207, 359/216–219, 708, 711, 718, 662

(56) References Cited

U.S. PATENT DOCUMENTS

| | | |
|---|---|---|
| 4,639,072 A | 1/1987 | Itoh et al. |
| 5,111,219 A | 5/1992 | Makino ........................ 346/108 |
| 5,448,502 A | 9/1995 | Kindo et al. ................. 364/526 |
| 6,134,040 A | * 10/2000 | Rim et al. ................... 359/207 |

FOREIGN PATENT DOCUMENTS

| | | |
|---|---|---|
| JP | 4-110817 | 4/1992 |
| JP | 8-76011 | 3/1996 |
| JP | 8-297256 | 11/1996 |
| KR | 98-39364 | 9/1998 |

* cited by examiner

*Primary Examiner*—James Phan
(74) *Attorney, Agent, or Firm*—Darby & Darby

(57) ABSTRACT

An optical scanner comprises a laser diode which scans laser beam of definite wavelength; first optical element which patterns the beam scanned from the laser diode to an almost parallel beam; a slit where long hole has been formed in main scan direction parallel to optical axis which slit is located in front of the first optical element; second optical element located in front of the slit, having refractivity in direction perpendicular to optical axis; an optical deflector where reflection plane has been provided which reflects with designated angle the laser beam that has been scanned from the laser diode and has passed the first optical element, slit and second optical element; and third optical element whose main scan direction is nonspherical shape and subscan direction is made spherical surface which optical element spots to scanned surface the laser beam reflected from the optical deflector. So it makes effect that the birefringence influence is decreased and the metal mold machining and the injection molding are made easier by making both surfaces of third optical element to have slow curvature shapes having relatively few inflection points. And it achieves effect that performance deterioration according to errors in assembling and environmental variation of temperature and humidity etc. by way of making refractivity of both surfaces of lens in main scan direction to be similar.

3 Claims, 4 Drawing Sheets

OPTICAL SCANNER

BACKGROUND OF THE INVENTION

1. Field of the Invention

Present invention relates optical scanner, and particularly that which can satisfy finite and infinite optical systems at same time.

2. Description of the Prior Art

Light modulated beam from laser diode 1 passes slit 3 having long hole form in main scan direction after the beam became almost parallel light beam by first optical element 2 in ordinary optical scanner.

This light beam that has passed slit 3 enters second optical element 4 having refractivity in subscan direction, then this main scan direction light beam that has passed second optical element 4 enters reflection plane 5a of optical deflector 5 as almost a parallel light, then is deflected to third optical element 6 while subscan direction light beam is deflected to third optical element 6 after forming image on reflection plane 5a of optical deflector 5.

Whence if each reflection plane 5a of optical deflector 5 has angular error (wobble) distorted with respect to rotation axis, it may influence bad effect in subscan direction when light beam forms an image on surface 7 where to be scanned.

Japanese Patent Publication Heisei 4-110817 to solve this matter in order to minimize influence from angular error has suggested to use in third optical element a toric surface having different curvature radius for main scan from subscan direction and to constitute an optical conjugate point from the scanned surface and the reflection plane of polygonal rotating mirror.

And U.S. Pat. No. 4,639,072 tried to prevent bad influence in performance owing to angular error (wobble) by way of placing cylinder lens near the scanned surface.

Third optical element images on scanned surface the light beam deflected by optical deflector into elliptic spot having major axis in subscan direction and at the same time satisfies f-θ characteristics for total scan range.

But because phenomenon arose that image formation points in subscan direction appear asymmetrically on right and left of scanned surface because the above described optical conjugate point is not maintained while deflection plane position is changed when optical deflector rotates, U.S. Pat. No. 5,448,502 suggested to minimize shift of imaging point in subscan direction by using for the scanning lens near scanned surface a modified cylinder lens where curvature radii in subscan direction are formed asymmetrically on right and left.

But most of the above described previous techniques are the scanning optical systems that are composed of cases each made of two or three combined pieces of plastic or glass.

Accordingly recently there has been proposed use of third optical element composed in one piece in aspects of cost reduction and equipment compactification.

Third optical element requires to be placed as near as possible to the optical reflector in order not to make itself a large one for good optical performance in broad effective scan range in a compact size of the scanning optical equipment.

But if third optical element is thus placed near optical deflector then magnification of third optical element in subscan direction becomes greater so that position error of spot in subscan direction on scanned surface may become greater in proportion to magnification in subscan direction if the beam come from second optical element as described above is to form a linear image with position error, so that the great position error bring result that image field curvature in subscan direction becomes relatively greater which may bring performance deterioration.

Though it is easy to correct well the image plane in subscan direction in conventional scanning optical equipment having third optical element made of two or three pieces because the equipment has several refraction surfaces in subscan direction, the scanning optical equipment having third optical element made of one piece has particular necessity that image field curvature particularly in subscan direction be corrected well at time of design because the equipment can have only two refraction surfaces in maximum.

But on the contrary in Japanese Patent Publication Heisei 8-76011 and 8-297256, magnification in subscan direction of third optical element has been made somewhat small so that wavefront aberration is increased at the imaging point near scanned surface so that eventually it becomes difficult to make the spot small which is imaged on the whole scanned surface.

Therefore it is important to place well the third optical element between scanned surface and deflection point of optical deflector.

And while polygonal rotating mirror is generally used as deflector, there is problem because rotation axis of polygonal rotating mirror is not on deflectional reflection plane, there is spatial aberration between image formation position and deflectional reflection plane so that there arises asymmetry in right and left with regard to deflection angle of polygonal rotating mirror with reference to scanned surface center point so that the asymmetry eventually causes performance deterioration of third optical element.

Because of such problems it was proposed that it is necessary to use a modified toric at least on one plane in case where third optical element is made of one piece of lens.

U.S. Pat. No. 5,111,219 has proposed to artificially converge beam coming from first optical element and to make third optical element to have meniscus shape having a convex surface in deflection plane.

But though meniscus form proposed in this invention has advantage that it can decrease difference in thickness between center and circumferential part, the form has disadvantage that it may be somewhat sensitive to tolerance because refractivity of each plane becomes large.

SUMMARY OF THE INVENTION

Present invention is devised to solve the various problems of such conventional scanning optical equipment so that the purpose is to provide a scanning optical equipment that may attempt optical performance improvement by taking advantages of finite and infinite optical systems together.

The scanning optical equipment according to present invention to achieve such purpose features conformation composed of a laser diode which scans laser beam of definite wavelength; first optical element which patterns the beam scanned from the above laser diode to an almost parallel beam; a slit where long hole has been formed in main scan direction parallel to optical axis which slit is located in front of the above first optical element; second optical element located in front of the above slit, having refractivity in direction perpendicular to optical axis; an optical deflector where reflection plane has been provided which reflects with designated angle the laser beam that has been scanned from the above laser diode and has passed the above first optical element, slit and second optical element; and third optical element whose main scan direction is nonspherical shape and subscan direction is made spherical surface which optical element spots to scanned surface the laser beam reflected from the above optical deflector.

A preferable characteristics of present invention is that the above third optical element satisfies the following condition equations to correct the image field curvature and the distortion aberration characteristics if distance from deflection point to first plane is taken as d, distance from deflection point to scanned surface is taken as L, center thickness of third optical element is taken as S and refractivity of third optical element for used wavelength is taken as n.

(Image field curvature) $M_1 = d/L \times S$, $1.54 \leq M_1 \leq 3.28$ (Distortion aberration characteristics) $M_2 = M_1 \times (n-1)$, $0.74 \leq M_2 \leq 1.87$ Another preferable characteristics of present invention is that the above third optical element is composed of both surfaces that are made of modified toric surface, among which the surface facing the optical deflector has convex shape.

And another preferable characteristics of present invention is to use infinite optical system where light beam that has passed the above first optical element becomes light beam composed of almost parallel components.

DESCRIPTION OF THE PREFERRED EMBODIMENTS

Preferable examples of scanning optical equipment according to present invention are explained as follows in detail referring to appended drawings.

Figure 1:
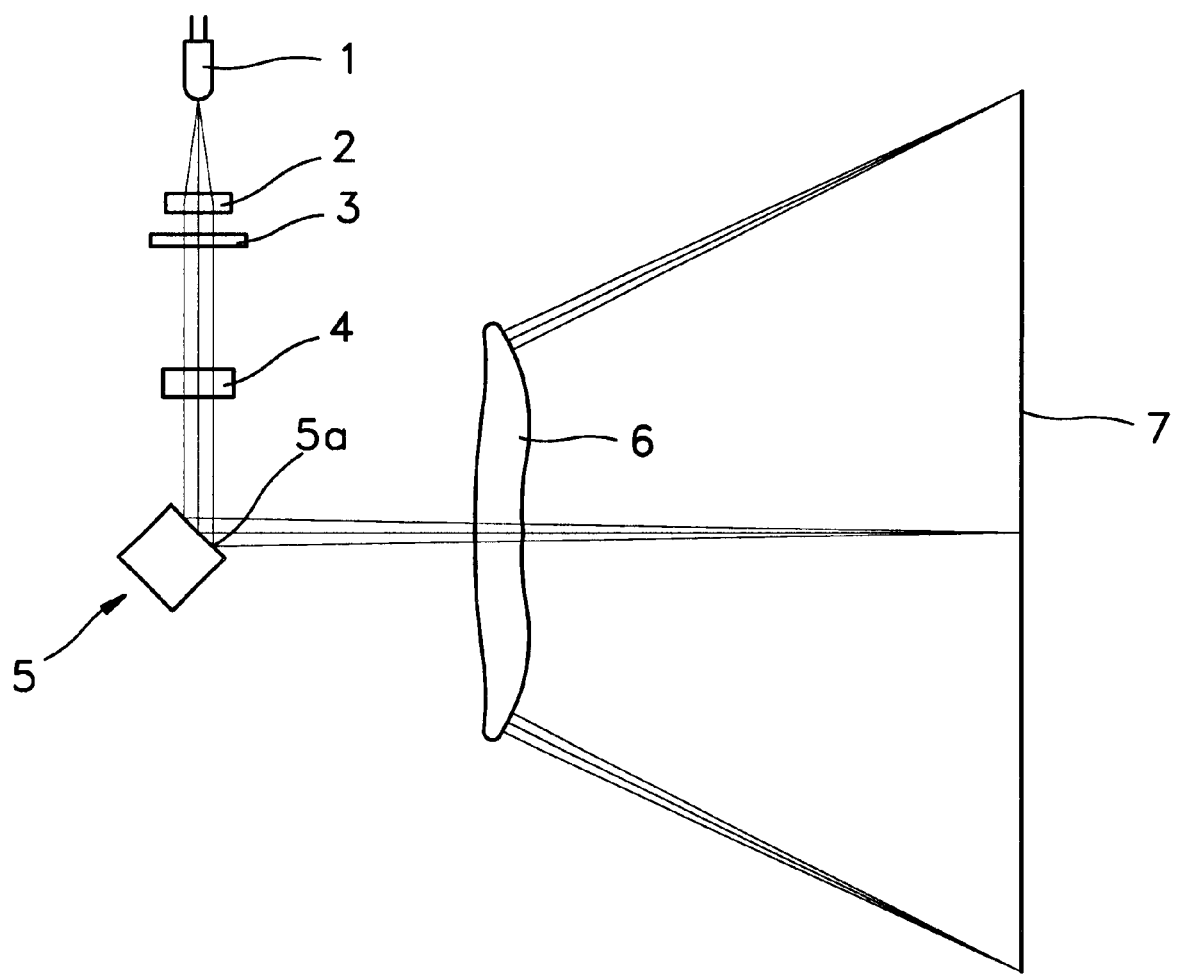
FIG. 1 is optical system configuration of conventional optical scanner.
Figure 2:
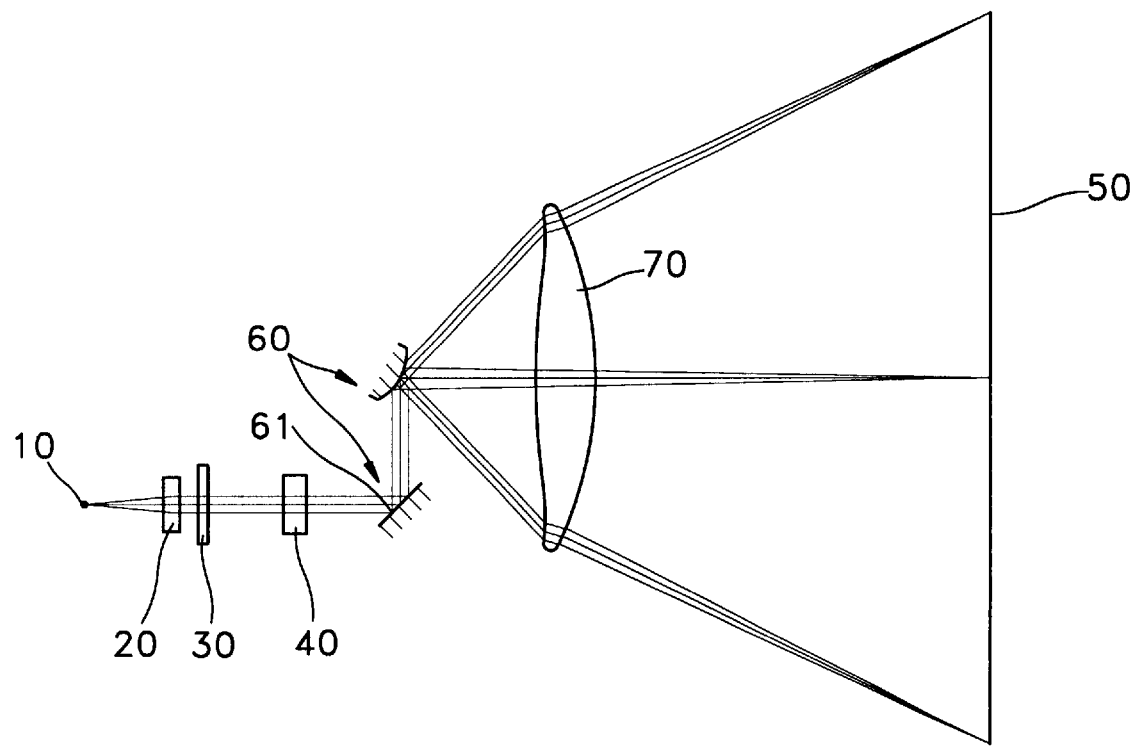
FIG. 2 is plan drawing of scanning optical equipment according to present invention.
Figure 3:
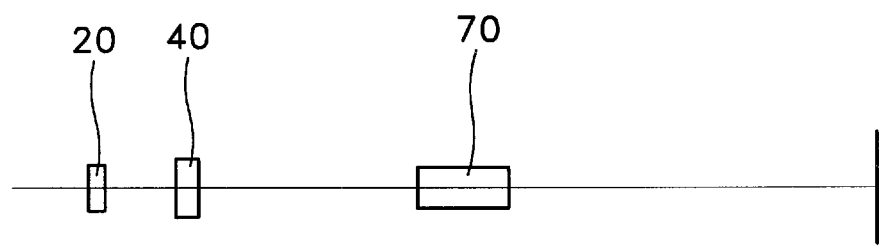
FIG. 3 is elevation view of FIG. 2.

FIG. 2 is plan of scanning optical equipment according to present invention, FIG. 3 is its elevation, and FIG. 4 through FIG. 9 are graphs showing characteristics in scanning optical equipment of present invention.

As shown there, scanning optical equipment according to present invention is furnished with laser diode 10 which scans laser beam of definite wavelength.

First optical element 20 which patterns the beam scanned from laser diode 10 to an almost parallel beam is located in front of laser diode 10.

A slit 30 where long hole has been formed in main scan direction parallel to optical axis is located in front of first optical element 20.

Second optical element 40 is located in front of slit 30, having refractivity in subscan direction perpendicular to optical axis.

And there is located in front of second optical element 40 an optical deflector 60 where reflection plane 61 has been provided which reflects with designated angle i.e. toward scanned surface 50 the laser beam that has been scanned from laser diode 10 and has passed first optical element 20, slit 30 and second optical element 40.

Reflection plane 61 in optical deflector 60 may be formed singular or plural.

Between optical deflector 60 and scanned surface 50 is located third optical element 70 which is particularly non-spherical shape in main scan direction and has spherical surface in subscan direction, spotting the laser beam to scanned surface 50.

This third optical element 70 comprises both surfaces that are made of modified toric surface, among which particularly the surface facing the optical deflector 60 has convex shape.

And third optical element 70 satisfies the following conditions to correct the image field curvature and the distortion aberration characteristics.

Namely the following equations are satisfied if distance from deflection point to first plane is taken as d, distance from deflection point to scanned surface is taken as L, center thickness of third optical element is taken as S and refractivity of third optical element for used wavelength is taken as n.

(Image field curvature) $M_1 = d/L \times S$, $1.54 \leq M_1 \leq 3.28$ (Distortion aberration characteristics) $M_2 = M_1 \times (n-1)$, $0.74 \leq M_2 \leq 1.87$ According as third optical element 70 satisfies the above described characteristics, light beam that has passed first optical element 20 becomes light beam composed of almost parallel components, that is, use of infinite optical system is feasible.

Operation conditions of the scanning optical equipment composed as above are explained as follows.

The beam scanned from laser diode 10 is patterned to an almost parallel beam by means of first optical element 20.

Parallel beam patterned so passing first optical element 20 passes sequentially slit 30 having major axis in main scan direction and second optical element 40 having refractivity in subscan direction.

Beam which passed thus slit 30 and second optical element 40 enters optical deflector 60 as the beam is almost parallel in main scan direction while it is linear image in subscan direction.

So beam that entered optical deflector 60 is reflected by reflection plane 61 and at same time deflectedly enters third optical element 70 so as to do uniform rectilinear motion on scanned surface 50 and images elliptic spot with major axis slightly longer in subscan direction.

Whence third optical element 70 allows to make focus on same line on scanned surface 50 although reflection plane 61 of optical deflector 60 might have some degree of angular error in subscan direction with respect to rotation axis because optical conjugate point has been constituted between scanned surface 50 and deflection point of optical deflector 60 that is polygonal rotating mirror.

Whence particularly because third optical element 70 is made of one lens of convex shape in main scan plane, having f-θ characteristics, correction of image field curvature and distortion aberration is done according to the above described equations so that subscan direction spot uniformity may be improved. Examples of present invention are shown in Table 1 through Table 3.

TABLE 1

| | Scanning lens shape | | Design parameter |
|---|---|---|---|
| | First plane | Second plane | Used wavelength: 785 nm |
| R | 139.493 | −142.582 | Incidence angle into optical deflector: 90° |
| K | −5.6460E+01 | −1.1257E+01 | Effective scan range: 107.4~−107.4 |
| B | −1.6614E−06 | −2.5477E−06 | Scanning lens refractivity: 1.52382 |
| C | 1.2977E−09 | 8.1529E−10 | Focal length of scanning lens: 136.6 mm |
| D | −6.8224E−13 | −2.0180E−13 | Effective diameter of scanning lens |
| E | 1.3146E−16 | −4.2910E−17 | Surface R1: 33.8 mm |
| r | −46.23 | −13.483 | Surface R2: 35.6 mm |

TABLE 1-continued

| Scanning lens shape | | Design parameter |
| --- | --- | --- |
| | First plane | Second plane | |
| A' | 2.7691E−03 | 4.1540E−04 | Distance from deflection point to scanning lens: 30.85 mm |
| B' | 4.7092E−06 | 7.9813E−08 | Center thickness of scanning lens: 11.965 mm |
| C' | 8.4907E−09 | −2.7984E−10 | Distance from deflection point to scanned surface: 175 mm |
| D' | — | 8.6394E−14 | Number of planes in optical deflector: 1 |
| E' | — | — | |

Figure 4:
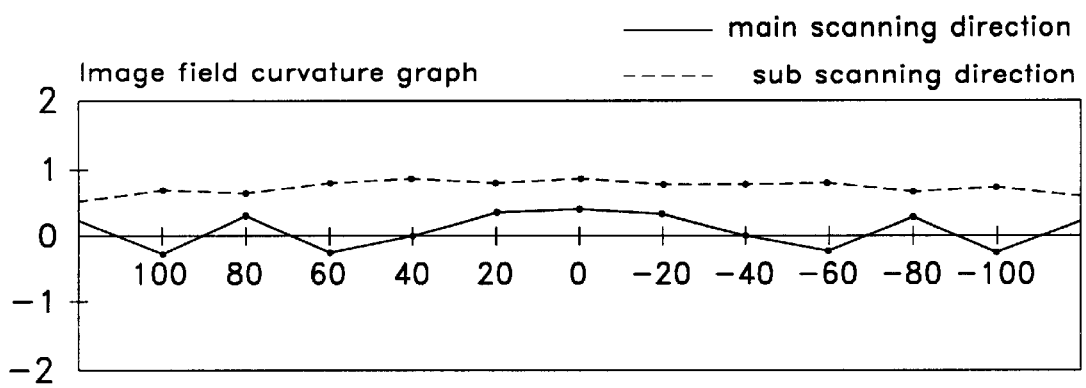
FIG. 4 through FIG. 9 are graphs showing characteristics in scanning optical equipment of present invention.
Figure 7:
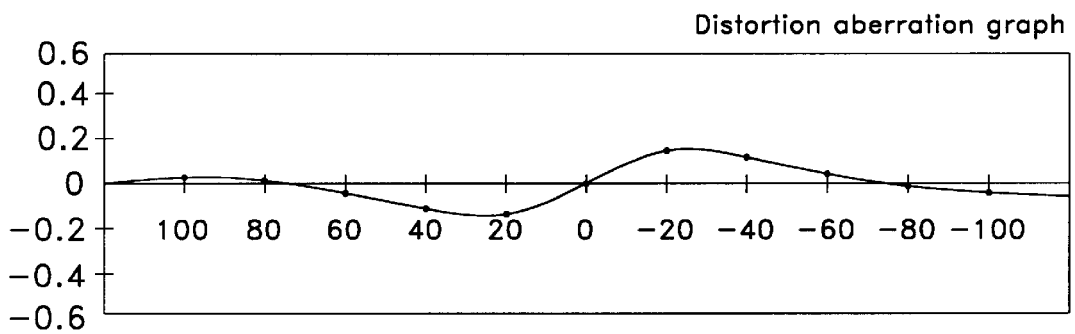

The graphs of image field curvatures status and distortion aberration compensation status according to Table 1 are shown in FIG. 4 and FIG. 7 respectively.

TABLE 2

| Scanning lens shape | | Design parameter |
| --- | --- | --- |
| | First plane | Second plane | |
| R | 139.493 | −142.679 | Used wavelength: 785 nm |
| | | | Incidence angle into optical deflector: 90° |
| K | −5.3584E+01 | −1.1101E+01 | Effective scan range: 107.4~−107.4 |
| B | −1.7396E−06 | −2.5486E−06 | Scanning lens refractivity: 1.52382 |
| C | 1.3661E−09 | 7.9791E−10 | Focal length of scanning lens: 136.6 mm |
| D | −6.5852E−13 | −1.8322E−13 | Effective diameter of scanning lens |
| E | 1.2410E−16 | −2.1818E−17 | Surface R1: 34.12 mm |
| r | −51.196 | −13.498 | Surface R2: 35.72 mm |
| A' | 2.8801E−03 | 4.3027E−04 | Distance from deflection point to scanning lens: 30.7 mm |
| B' | 7.1568E−06 | 3.3262E−08 | Center thickness of scanning lens: 11.7 mm |
| C' | 6.3368E−09 | −2.3889E−10 | Distance from deflection point to scanned surface: 174.6 mm |
| D' | 1.7609E−11 | 7.7734E−14 | Number of planes in optical deflector: 2 |
| E' | — | — | |

Figure 5:
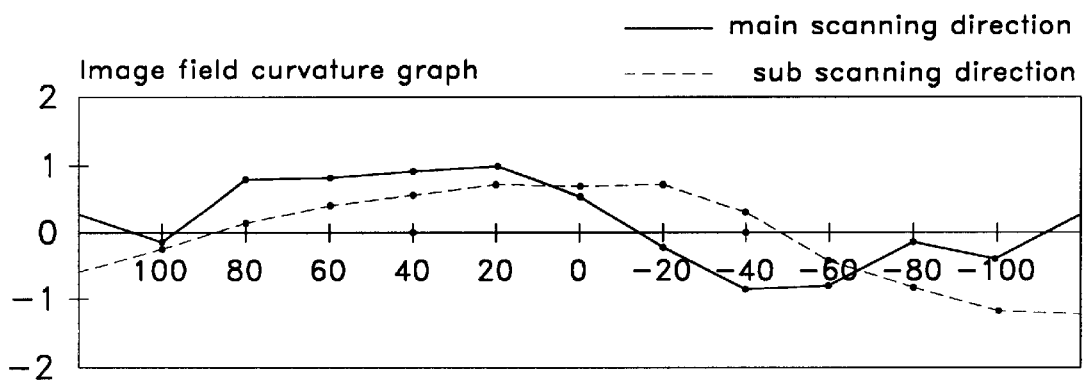
Figure 8:
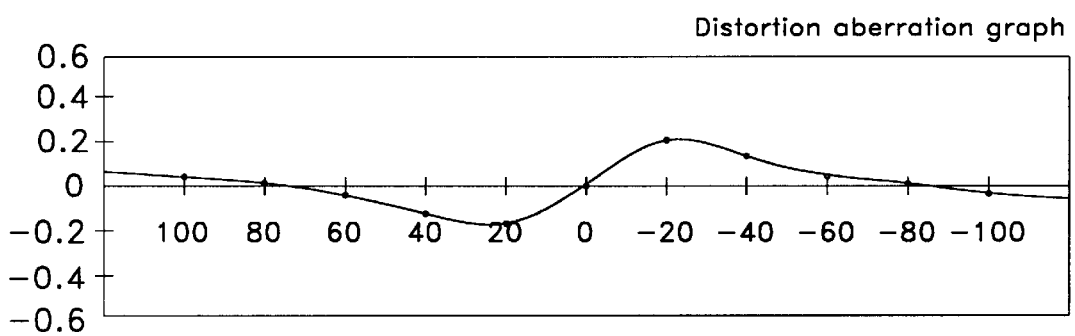

The graphs of image field curvature status and distortion aberration compensation status according to Table 2 are shown in FIG. 5 and FIG. 8 respectively.

TABLE 3

| Scanning lens shape | | Design parameter |
| --- | --- | --- |
| | First plane | Second plane | |
| R | 163.038 | −124.347 | Used wavelength: 785 nm |
| | | | Incidence angle into optical deflector: 90° |
| K | −6.6806E+01 | −1.2832E+01 | Effective scan range: 107.4~−107.4 |
| B | −1.4880E−06 | −2.5322E−06 | Scanning lens refractivity: 1.52382 |
| C | 1.2745E−09 | 8.6546E−10 | Focal length of scanning lens: 136.6 mm |
| D | −6.9457E−13 | −1.8951E−13 | Effective diameter of scanning lens |
| E | 1.3265E−16 | −5.6262E−17 | Surface R1: 34.38 mm |
| r | −48.501 | −13.539 | Surface R2: 35.94 mm |
| A' | 2.9100E−03 | 3.9744E−04 | Distance from deflection point to scanning lens: 30.76 mm |
| B' | 5.3121E−06 | 3.3123E−08 | Center thickness of scanning lens: 11.8 mm |
| C' | 6.4206E−09 | −2.3208E−10 | Distance from deflection point to scanned surface: 175.0 mm |
| D' | — | 8.6394E−14 | Number of planes in optical deflector: 4 |
| E' | — | — | |

Figure 6:
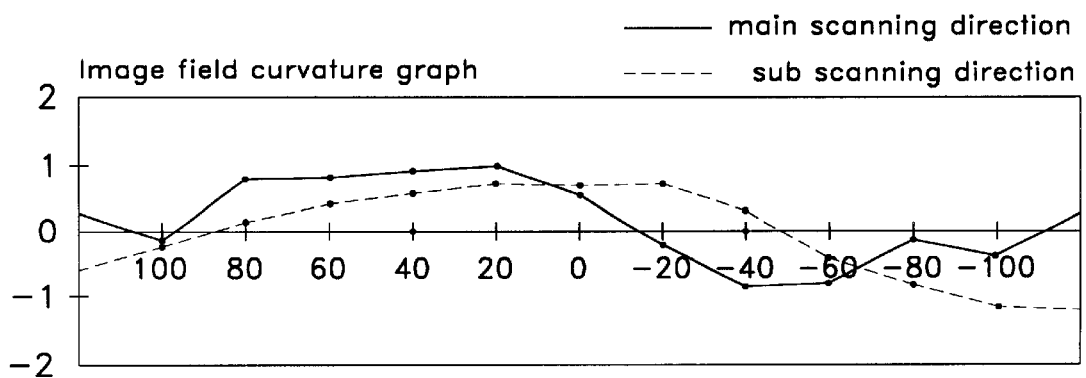
Figure 9:
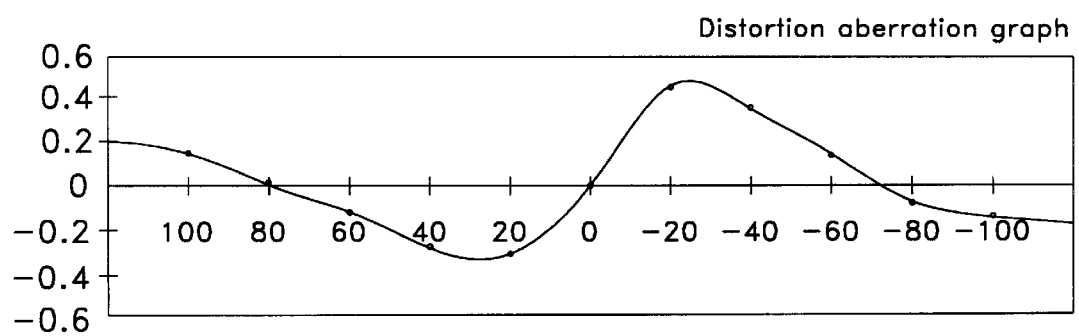

The graphs of image field curvature status and distortion aberration compensation status according to Table 3 are shown in FIG. 6 and FIG. 9 respectively.

If it is according to optical scanner following the present invention as described above, then it makes effect that the birefringence influence is decreased and the metal mold machining and the injection molding are made easier by making both surfaces of third optical element to have slow curvature shapes having relatively few inflection points.

And it achieves effect that performance deterioration according to errors in assembling and environmental variation of temperature and humidity etc. by way of making refractivity of both surfaces of lens in main scan direction to be similar.

What is claimed is:

1. An optical scanner comprising:

a laser diode which emits a laser beam of definite wavelength;

first optical element which patterns the beam scanned from said laser diode to an almost parallel beam;

a slit where a long hole has been formed in a main scan direction perpendicular to an optical axis, which slit is located in front of said first optical element;

second optical element located in front of said slit, having refractivity in a direction perpendicular to an optical axis;

an optical deflector where a reflection plane has been provided which reflects with designated angle the laser beam that has been emitted from said laser diode and has passed said first optical element, slit and second optical element; and third optical element whose main scan direction is a nonspherical shape and subscan direction is made a spherical surface which optical element spots to a scanned surface the laser beam reflected from said optical deflector, wherein said third optical element consists essentially of two optical surfaces and both surfaces are modified toric surfaces, among which the surface facing said optical deflector has convex shape.

2. The optical scanner in claim 1, wherein said third optical element satisfied the following condition equations to correct the image field curative and the distortion aberration characteristics if distance from deflection point to first plane is taken as d, distance from deflection point to scanned surface is taken as L, center thickness of third optical element is taken as S and refractivity of third optical element for used wavelength is taken as n.

(Image field curvature) $M_1 = d/L \times S$, $1.54 \leq M_1 \leq 3.28$ (Distortion aberration characteristics) $M_2 = M_1 \times (n-1)$, $0.74 \leq M_2 \leq 1.87$.

3. The optical scanner in claim 1, wherein said optical scanner uses infinite optical system where light beam that has passed said first optical element becomes light beam composed of almost parallel components.

* * * * *